United States Patent
Matsuda et al.

(10) Patent No.: US 10,972,035 B2
(45) Date of Patent: Apr. 6, 2021

(54) MOTOR DRIVE APPARATUS FOR ESTIMATING STRAY CAPACITANCE

(71) Applicant: FANUC CORPORATION, Yamanashi (JP)

(72) Inventors: Ryou Matsuda, Yamanashi (JP); Taku Sasaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/261,575

(22) Filed: Jan. 30, 2019

(65) Prior Publication Data
US 2019/0245469 A1    Aug. 8, 2019

(30) Foreign Application Priority Data

Feb. 5, 2018    (JP) .............................. JP2018-018392

(51) Int. Cl.
*H02P 23/14*    (2006.01)
*H02P 27/06*    (2006.01)

(52) U.S. Cl.
CPC .............. *H02P 23/14* (2013.01); *H02P 27/06* (2013.01)

(58) Field of Classification Search
CPC .......... H02P 27/06; H02M 7/00; G01R 31/02; G01R 31/12; G01R 31/34
See application file for complete search history.

(56) References Cited

U.S. PATENT DOCUMENTS

| | | | | |
|---|---|---|---|---|
| 5,748,459 A | * | 5/1998 | Yamada ................. | H02M 7/00 363/56.03 |
| 8,816,694 B2 | * | 8/2014 | Obata ................. | H02K 15/105 324/536 |
| 9,099,945 B2 | * | 8/2015 | Sakai ..................... | H02M 1/12 |
| 2013/0264984 A1 | * | 10/2013 | Tamura ................. | H02M 7/48 318/400.27 |
| 2014/0176152 A1 | * | 6/2014 | Wolbank ............ | G01R 31/1227 324/510 |
| 2016/0124038 A1 | * | 5/2016 | Matsushita ............ | G01R 31/50 324/510 |
| 2017/0089983 A1 | * | 3/2017 | Kato ....................... | G01R 31/50 |

FOREIGN PATENT DOCUMENTS

| | | |
|---|---|---|
| CN | 1727908 A | 2/2006 |
| CN | 1897447 A | 1/2007 |
| CN | 103733080 A | 4/2014 |
| JP | H5-249157 A | 9/1993 |
| JP | H10-32931 A | 2/1998 |
| JP | 2004-104898 A | 4/2004 |

(Continued)

*Primary Examiner* — Said Bouziane
(74) *Attorney, Agent, or Firm* — Hauptman Ham, LLP

(57) ABSTRACT

A motor drive apparatus includes an inverter configured to convert an input DC voltage into an AC voltage for driving a motor, by ON/OFF driving of an internal power element, and outputs the AC voltage, a high-frequency current detection unit configured to detect a high-frequency current from a current flowing through a motor power line upon application of the AC voltage output from the inverter to the motor via the motor power line, and a stray capacitance estimation unit configured to estimate a stray capacitance occurring in the motor power line and the motor, based on the high-frequency current detected by the high-frequency current detection unit.

1 Claim, 5 Drawing Sheets

(56) References Cited

FOREIGN PATENT DOCUMENTS

| | | |
|---|---|---|
| JP | 2004-184275 A | 7/2004 |
| JP | 2004-312864 A | 11/2004 |
| JP | 2004-317164 A | 11/2004 |
| JP | 2007-221851 A | 8/2007 |
| JP | 2008-99505 A | 4/2008 |
| JP | 2008-99507 A | 4/2008 |
| JP | 2017-184361 | 10/2017 |
| WO | 2012/070117 A1 | 5/2012 |

* cited by examiner

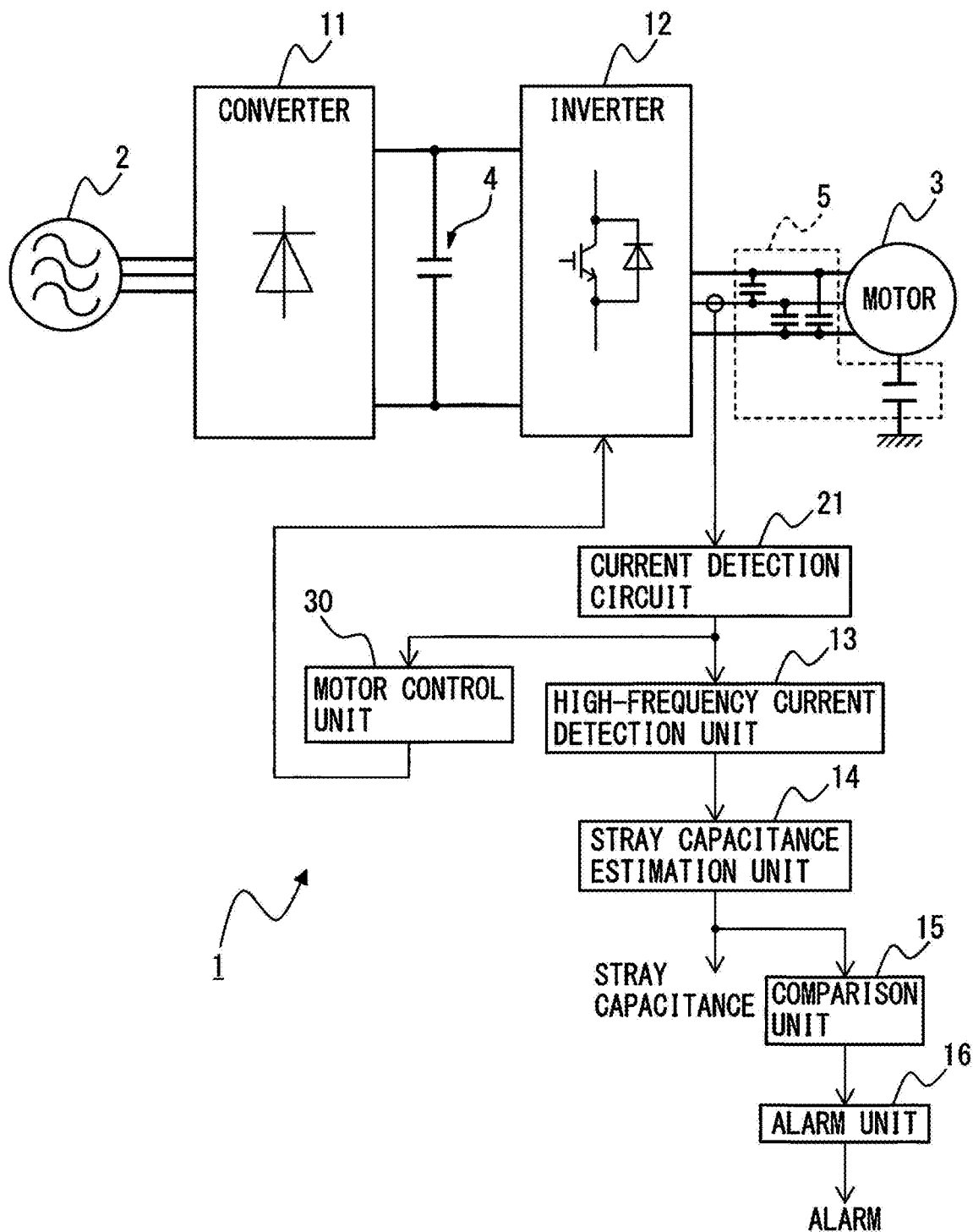

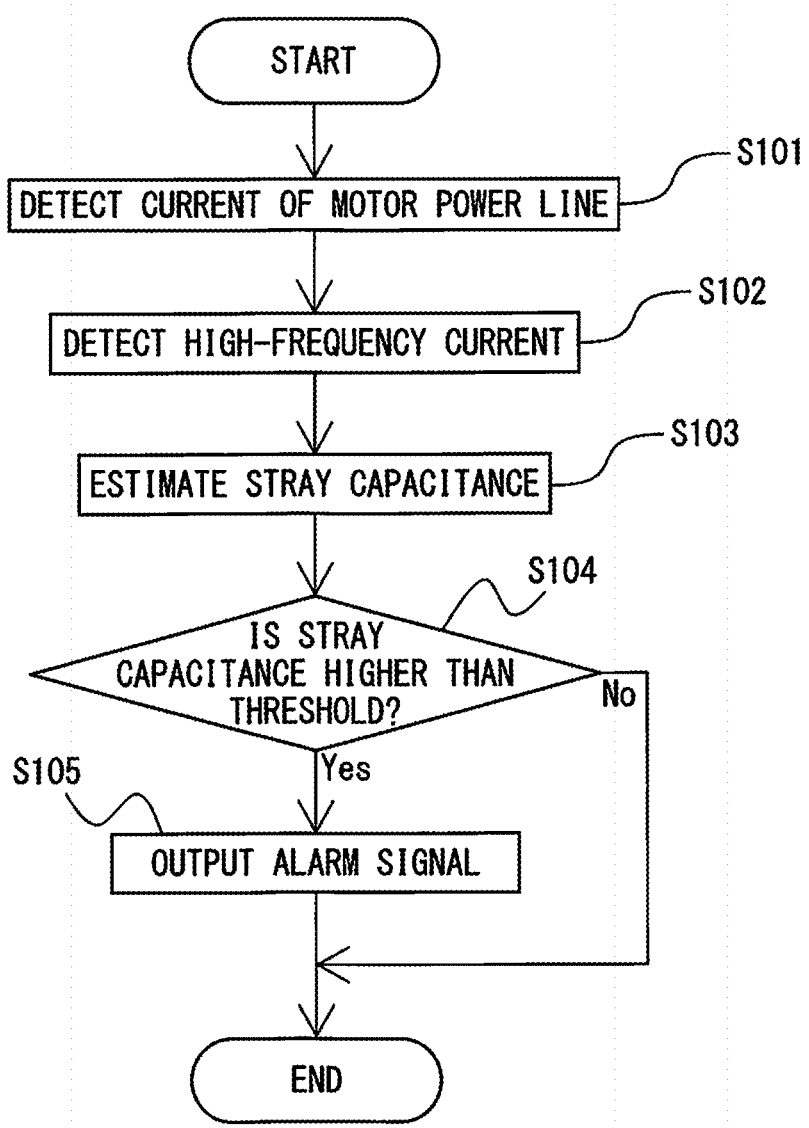

MOTOR DRIVE APPARATUS FOR ESTIMATING STRAY CAPACITANCE

RELATED APPLICATIONS

The present application claims priority of Japanese Application Number 2018-018392, filed on Feb. 5, 2018, the disclosure of which is hereby incorporated by reference herein in its entirety.

BACKGROUND OF THE INVENTION

1. Field of the Invention

The present invention relates to a motor drive apparatus for estimating a stray capacitance.

2. Description of the Related Art

In a motor drive apparatus which drives motors in a machine tool, forging machinery, an injection molding machine, industrial machinery, or various robots, AC power supplied from an AC power supply is temporarily converted into DC power, the DC power is further converted into AC power, and the AC power is supplied to the motor provided for each drive axis via a motor power line as drive power. Therefore, the motor drive apparatus includes a converter (rectifier) which converts (rectifies) AC power input from the AC power supply into DC power, and an inverter which converts DC power in a DC link on the DC side of the converter into AC power.

An inverter which supplies drive power to a motor in a motor drive apparatus is implemented in a bridge circuit of power elements (semiconductor switching elements) and diodes connected in antiparallel with the power elements. The inverter converts an input DC voltage (i.e., the DC voltage of a DC link) into an AC voltage for driving a motor, by ON/OFF driving of the internal power elements, based on a switching command received from a motor control unit. During high-speed ON/OFF driving of the power elements in the inverter, a high-frequency current flows via a stray capacitance occurring in a motor power line and the motor. The high-frequency current flowing via the stray capacitance causes, e.g., erroneous operations of an internal circuit and a peripheral device of the motor drive apparatus due to high-frequency noise, a reduction in power factor of the motor drive apparatus, or heating or breakage of the motor drive apparatus, the motor power line, and the peripheral device. Examples of the peripheral device may include a CNC (Computerized Numerical Control) device and a PLC (Programmable Logic Controller).

As disclosed in, e.g., International Publication WO 2012/070117, a motor drive circuit which performs PWM driving of an AC motor is known to include a rectifier circuit which rectifies power from an AC power supply, a DC intermediate circuit which smooths and holds output of the rectifier circuit, an inverter circuit which performs PWM control of a voltage applied to the AC motor, based on DC power held in the DC intermediate circuit, and a filter circuit inserted between the AC power supply and the rectifier circuit, the filter circuit including a noise filter which reduces harmonic noise that may occur regardless of whether the PWM control is performed, and a band cutoff filter which reduces harmonic noise that has a certain bandwidth and may occur upon the PWM control.

As disclosed in, e.g., Japanese Unexamined Patent Publication No. H10-032931, a controller for a harmonic suppression apparatus is known to include a controller which is connected to an electric line, detects a harmonic current component superimposed on the electric line, and outputs a signal opposite in phase to the detected harmonic component as a control signal, and an active filter which receives the control signal and injects a current proportional to the control signal into the electric line via a matching transformer, the apparatus further including a transformer which detects a voltage at an installation point of the harmonic suppression apparatus, wherein the detected voltage from the transformer is input to the controller, a control current is derived by eliminating a fundamental component from the input detected voltage and performing multiplication by (1/R), and the product is inverted in sign and added to the control current detected from the electric line to obtain a current input to the active filter.

As disclosed in, e.g., Japanese Unexamined Patent Publication No. 2004-312864, a motor controller is known to include a current detection circuit which detects a current flowing through a three-phase AC motor, a fundamental current control circuit which performs feedback control of a fundamental component of a motor current in a dq coordinate system rotating in synchronism with rotation of the motor, a harmonic current control circuit which performs feedback control of a harmonic component of the motor current in a dhqh coordinate system rotating at a frequency that is an integer multiple of a frequency of the fundamental component of the motor current, a command value calculation circuit which calculates an AC voltage command value by adding the output of the fundamental current control circuit to the output of the harmonic current control circuit, and a power conversion circuit which generates a three-phase AC voltage corresponding to the AC voltage command value and applies the three-phase AC voltage to the three-phase AC motor, the controller further including a harmonic component elimination circuit which eliminates the harmonic component of the motor current from an error deviation between a fundamental current command value and a motor current feedback value in the fundamental current control circuit.

SUMMARY OF INVENTION

In the motor drive apparatus, since a high-frequency current flowing via a stray capacitance occurring in the motor power line and the motor causes, e.g., erroneous operations of an internal circuit and a peripheral device of the motor drive apparatus due to high-frequency noise, a reduction in power factor of the motor drive apparatus, or heating or breakage of the motor drive apparatus and the motor power line, it is important to keep the stray capacitance as low as possible. In a measure against the stray capacitance, a high-frequency current is preferably measured using a separate high-frequency current measurement device. However, adding a high-frequency current measurement device which measures a high-frequency current raises the cost of the motor drive apparatus. Further, it requires substantial time and effort to calculate the stray capacitance, based on the high-frequency current measured by the high-frequency current measurement device, and thus measures against stray capacitance may not be efficiently carried out. Therefore, in the field of the motor drive apparatus, demand has arisen for a technique capable of easily determining the stray capacitance of the motor power line and the motor at low cost.

According to one aspect of the present disclosure, a motor drive apparatus includes an inverter configured to convert an input DC voltage into an AC voltage for driving a motor, by ON/OFF driving of an internal power element, and outputs the AC voltage, a high-frequency current detection unit configured to detect a high-frequency current from a current flowing through a motor power line upon application of the AC voltage output from the inverter to the motor via the motor power line, and a stray capacitance estimation unit configured to estimate a stray capacitance occurring in the motor power line and the motor, based on the high-frequency current detected by the high-frequency current detection unit.

BRIEF DESCRIPTION OF THE DRAWINGS

The present invention will be more clearly understood with reference to the following accompanying drawings, of which:

FIG. 1 is a diagram illustrating a motor drive apparatus according to an embodiment of the present disclosure;

FIG. 5 is a flowchart illustrating the operation sequence of the motor drive apparatus according to the embodiment of the present disclosure.

DETAILED DESCRIPTION

Figure 2A:
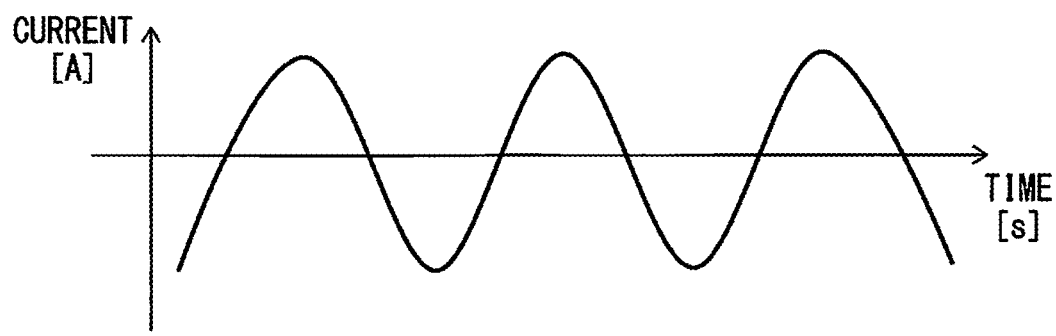
FIG. 2A is a graph illustrating an exemplary current flowing through a motor power line and detected by a current detection circuit and represents an exemplary current containing no high-frequency current.

A motor drive apparatus for estimating a stray capacitance will be described below with reference to the drawings. These drawings use different scales as appropriate to facilitate an understanding. The mode illustrated in each drawing is one example for carrying out the present invention, and the present invention is not limited to the embodiments illustrated in these drawings.

FIG. 1 is a diagram illustrating a motor drive apparatus according to an embodiment of the present disclosure.

The case where one AC motor of the single-winding type (to be simply referred to as a "motor" hereinafter) 3 is controlled by a motor drive apparatus 1 connected to an AC power supply 2 will be taken as an example below. The number of motors 3 does not particularly limit this embodiment and may be other than one. The motor 3 may be of the multiple-winding type. An inverter 12 is provided for each motor winding. The inverter 12 is provided, for example, for each motor 3 when a plurality of motors 3 of the single-winding type are used, for each winding when one motor 3 of the multiple-winding type is used, or for each winding of each motor 3 when a plurality of motors 3 of the multiple-winding type are used. A high-frequency current detection unit 13 and a stray capacitance estimation unit 14 in this embodiment need only be provided, for example, in one-to-one correspondence with the inverter 12. Machines equipped with the motors 3 include, e.g., a machine tool, a robot, forging machinery, an injection molding machine, industrial machinery, various electrical appliances, an electric train, an automobile, and an aircraft.

The numbers of phases of the AC power supply 2 and the motor 3 connected to the motor drive apparatus 1 do not particularly limit this embodiment, and a three- or single-phase configuration, for example, may be used. The type of motor 3 does not particularly limit this embodiment, either, and an induction or synchronous motor, for example, may be used. In the following example, the motor drive apparatus 1 includes a converter 11 and an inverter 12 and drives the AC motor 3 using the AC power supply 2 as a drive source, but this embodiment is also applicable to a motor drive apparatus including no converter and including an inverter which uses a DC power supply (not illustrated) such as a battery as a power source.

Before a description of the motor drive apparatus 1 according to one embodiment, drive control for the motor 3 will be described below. The motor drive apparatus 1 controls an inverter 12 which converts a DC voltage input (applied) from a DC link into an AC voltage for driving the motor 3 and outputs the AC voltage, like general motor drive apparatuses. A motor control unit 30 in the motor drive apparatus 1 generates a switching command for controlling the rotation speed, the torque, or the rotor position of the motor 3, based on, e.g., the rotation speed of the motor 3 (speed feedback), a current flowing through a motor power line and detected via a current detection circuit 21 (current feedback), a predetermined torque command, and an operation program for the motor 3. The power conversion operation of the inverter 12 is controlled based on the switching command generated by the motor control unit 30.

The motor drive apparatus 1 includes an inverter 12, a high-frequency current detection unit 13, a stray capacitance estimation unit 14, and the above-mentioned motor control unit 30, as illustrated in FIG. 1. The motor drive apparatus 1 further includes a converter 11 which supplies a DC voltage (DC power) to the inverter 12. The motor drive apparatus 1 may even include a comparison unit 15 and an alarm unit 16 as options.

The converter 11 converts an AC voltage input from the AC power supply 2 into a DC voltage and outputs the DC voltage to the DC link on the DC side. Examples of the converter 11 may include a diode rectifier circuit, a 120-degree conduction rectifier circuit, and a PWM switching control rectifier circuit including a power element. In this embodiment, the converter 11 serves as a three-phase bridge circuit because the AC power supply 2 has a three-phase configuration, but it serves as a single-phase bridge circuit when the AC power supply 2 has a single-phase configuration. When a DC power supply (not illustrated) such as a battery is used as a source for supplying a DC voltage to the inverter 12, the motor drive apparatus 1 does not include a converter.

A DC link capacitor (also called a smoothing capacitor) 4 is provided in the DC link connecting the DC output of the converter 11 to the DC input of the inverter 12. The DC link capacitor 4 has the function of suppressing pulsation of the DC output of the converter 11 and the function of storing DC power in the DC link.

The inverter 12 is implemented in a bridge circuit of power elements (semiconductor switching elements) and diodes connected in antiparallel with the power elements, and converts a DC voltage input from the DC link into an AC voltage for driving the motor 3, by ON/OFF driving of each power element, based on the switching command received from the motor control unit 30, and outputs the AC voltage. The inverter 12 and the motor 3 are connected to each other via a motor power line, and a voltage output from the inverter 12 is therefore applied across the terminals of the motor 3 via the motor power line. More specifically, the inverter 12 performs ON/OFF driving of the internal power elements, based on the switching command received from the motor control unit 30, to convert a DC voltage input from the DC link into an AC voltage having a desired voltage and a desired frequency for driving the motor 3 and output the AC voltage. Thus, an AC drive current is supplied to the motor 3 via the motor power line. Examples of the power element may include an IGBT, a thyristor, a GTO, and a transistor, but the type of power element itself does not limit this embodiment, and other types of power elements may be used. In this embodiment, the inverter 12 serves as a three-phase bridge circuit because the motor 3 connected to the motor drive apparatus 1 is implemented as a three-phase AC motor, but it serves as a single-phase bridge circuit when the motor 3 is implemented as a single-phase AC motor.

A current flows from the inverter 12 into the motor 3 via the motor power line upon application of the AC voltage output from the inverter 12 to the motor 3 via the motor power line. The current flowing through the motor power line is detected by the current detection circuit 21. The current detection circuit 21 may also serve as, e.g., a current detection circuit generally provided to detect an inverter output current fed back to the motor control unit 30 to control the conversion operation of the inverter 12. A low-pass filter (not illustrated in FIG. 1) is generally provided on the downstream side of the current detection circuit 21 to feed back an inverter output current obtained by eliminating high-frequency components to the motor control unit 30.

Figure 2B:
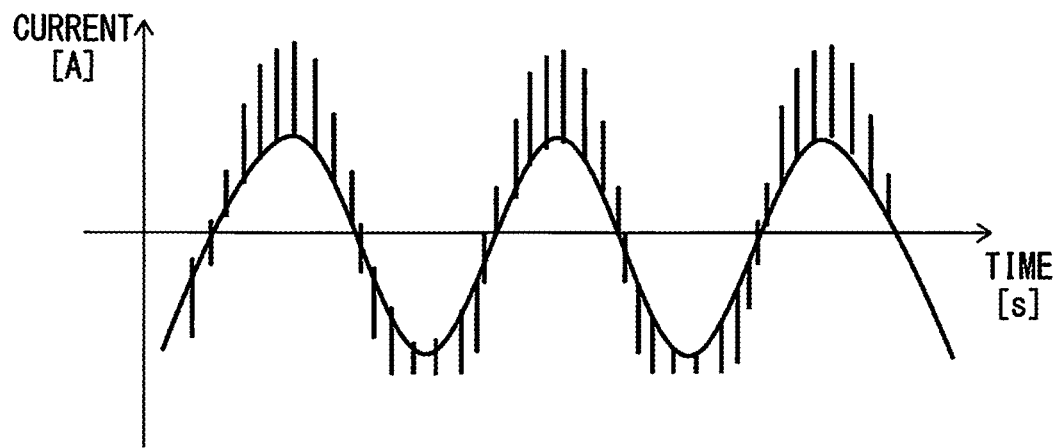
FIG. 2B is a graph illustrating another exemplary current flowing through the motor power line and detected by the current detection circuit and represents an exemplary current containing a high-frequency current.

The high-frequency current detection unit 13 detects a high-frequency current from the current flowing through the motor power line and detected by the current detection circuit 21. FIG. 2A is a graph illustrating an exemplary current flowing through a motor power line and detected by a current detection circuit and represents an exemplary current containing no high-frequency current. FIG. 2B is a graph illustrating another exemplary current flowing through the motor power line and detected by the current detection circuit and represents an exemplary current containing a high-frequency current. FIGS. 2A and 2B illustrate no current ripple components occurring upon PWM control, for the sake of drawing simplicity. The current that flows through the motor power line connecting the inverter 12 and the motor 3 to each other and is detected by the current detection circuit 21 contains a high-frequency current due to ON/OFF driving of the power elements in the inverter 12, as illustrated in FIG. 2B. Generally, as the inverter output current fed back to the motor control unit 30 to control the conversion operation of the inverter 12, a current, as illustrated in FIG. 2A, obtained by eliminating high-frequency components using the low-pass filter (not illustrated in FIG. 1) from a current containing a high-frequency current, as illustrated in FIG. 2B, is used. A method for detecting a high-frequency current by the high-frequency current detection unit 13 will be described in detail later.

The stray capacitance estimation unit 14 estimates a stray capacitance occurring in the motor power line and the motor 3, based on the high-frequency current detected by the high-frequency current detection unit 13. Referring to FIG. 1 and FIGS. 2A, 2B, and 3 (to be described later), reference numeral 5 denotes a stray capacitance occurring in the motor power line and the motor 3. In this embodiment, a current flowing through the stray capacitance occurring in the motor power line and the motor 3 is assumed to be high-frequency components of the current flowing through the motor power line, and a stray capacitance occurring in the motor power line and the motor 3 is estimated based on the high-frequency current detected by the high-frequency current detection unit 13. This will be described in more detail below.

The stray capacitance estimation unit 14 calculates a stray capacitance occurring in the motor power line and the motor 3, by dividing the value of the high-frequency current detected by the high-frequency current detection unit 13 by the amount of change per unit time in voltage across the two terminals of the power element. The magnitude i of the high-frequency current is given by the following equation (1):

[Equation 1]

$$i = \frac{dq}{dt} = C\frac{dV}{dt} \quad (1)$$

where q is the stored charge of the stray capacitance, C is the capacitance of the stray capacitance, and V is the voltage across the two terminals of the power element.

The stray capacitance estimation unit 14 calculates a stray capacitance C occurring in the motor power line and the motor 3, by dividing the magnitude i of the high-frequency current detected by the high-frequency current detection unit 13 by the amount of change dV/dt per unit time in voltage across the two terminals of the power element, in accordance with equation (1) as above. The amount of change dV/dt per unit time in voltage across the two terminals of the power element is generally defined as specification data associated with the power element and is specified in, e.g., a specification table or an instruction manual of the power element. Alternatively, the amount of change dV/dt per unit time in voltage across the two terminals of the power element may be calculated by a preliminary experiment. When, for example, the magnitude i of the high-frequency current detected by the high-frequency current detection unit 13 is 5 A, and the amount of change dV/dt per unit time in voltage across the two terminals of the power element is 500 V/μs, the stray capacitance C is "5 A÷500 V/μs=10 μF."

The value of the stray capacitance estimated by the stray capacitance estimation unit 14 may be displayed on an accessory display (not illustrated) attached to, e.g., a personal computer, a portable terminal, a control terminal for the motor drive apparatus 1, or a host controller for the motor drive apparatus 1. A user informed of the stray capacitance occurring in the motor power line and the motor 3 via the display can make design changes such that, for example, a motor power line connecting the inverter 12 and the motor 3 to each other or a power supply line connecting the converter 11 and the AC power supply 2 to each other is exchanged with a shorter one, or the wiring position is changed. When, for example, a plurality of machine tools are present in a plant, since providing a high-frequency current detection unit 13 and a stray capacitance estimation unit 14 for each inverter 12 of the motor drive apparatus 1 provided in each individual machine tool allows the user to know the stray capacitance for each machine (i.e., each machine tool, each motor drive apparatus 1, or each inverter 12), design changes for each machine or design changes in the system as a whole, for example, can be efficiently made. Data associated with the stray capacitance estimated by the stray capacitance estimation unit 14 may be stored in a storage device and used for another purpose.

The comparison unit 15 compares the stray capacitance estimated by the stray capacitance estimation unit 14 with a predefined threshold. The alarm unit 16 outputs an alarm signal when, as a result of comparison by the comparison unit 15, the stray capacitance estimated by the stray capacitance estimation unit 14 is higher than the threshold. For example, the threshold is set to a value which allows detection of the occurrence of a stray capacitance high enough to cause, e.g., erroneous operations of an internal circuit and a peripheral device of the motor drive apparatus due to high-frequency noise, a reduction in power factor of the motor drive apparatus, or heating or breakage of the motor drive apparatus, the motor power line, and the peripheral device. In this case, the alarm unit 16 outputs an alarm signal when the stray capacitance estimated by the stray capacitance estimation unit 14 is higher than the threshold, and, for example, "a stray capacitance high enough to cause, e.g., erroneous operations, heating, or breakage has occurred" can be displayed on an accessory display attached to, e.g., a personal computer, a portable terminal, a control terminal for the motor drive apparatus 1, or a host controller for the motor drive apparatus 1, based on the alarm signal. Alternatively, the user may be informed, "a stray capacitance high enough to cause, e.g., erroneous operations, heating, or breakage has occurred" by an acoustic device which emits a sound such as a loudspeaker, a buzzer, or a chime, based on the alarm signal. This information may even be printed out and displayed on, e.g., a sheet surface using a printer, based on the alarm signal. Or again, the user may be informed, "a stray capacitance high enough to cause, e.g., erroneous operations, heating, or breakage has occurred" by combining the above-mentioned examples together as appropriate.

As the threshold used in comparison processing by the comparison unit 15, thresholds having two levels: high and low may be set. For example, a first threshold for detecting, "a stray capacitance high enough to supposedly generate heat in large quantities, although not enough to cause erroneous operations or breakage, has occurred" may be set, and a second threshold larger than the first threshold, for detecting, "a stray capacitance high enough to cause erroneous operations or breakage has occurred," may be set. For example, the alarm unit 16 outputs a warning signal as a preliminary alarm when, as a result of comparison by the comparison unit 15, the stray capacitance estimated by the stray capacitance estimation unit 14 is higher than the first threshold, and outputs an alarm signal when the stray capacitance estimated by the stray capacitance estimation unit 14 is higher than the second threshold. An accessory display attached to, e.g., a personal computer, a portable terminal, a control terminal for the motor drive apparatus 1, or a host controller for the motor drive apparatus 1 can display, "a stray capacitance high enough to supposedly generate heat in large quantities has occurred" when the warning signal is received, and display, "a stray capacitance high enough to cause erroneous operations or breakage has occurred" when the alarm signal is received. The same applies when the informing unit for the user serves as a printer or an acoustic device which emits a sound such as a loudspeaker, a buzzer, or a chime, as described above. By dividing the state in which a stray capacitance to be sent to the user occurs into two levels so that thresholds having two levels: high and low are set and a warning signal or an alarm signal is output in accordance with the stray capacitance in this manner, a more careful measure can be taken. More efficient design changes can be made such that, for example, the wiring position of a motor power line connecting the inverter 12 and the motor 3 to each other or a power supply line connecting the converter 11 and the AC power supply 2 to each other is changed when the user is informed, "a stray capacitance high enough to supposedly generate heat in large quantities, although not enough to cause erroneous operations or breakage, has occurred" via, e.g., a display, or a motor power line connecting the inverter 12 and the motor 3 to each other or a power supply line connecting the converter 11 and the AC power supply 2 to each other is exchanged with a shorter one when the user is informed, "a stray capacitance high enough to cause erroneous operations or breakage has occurred."

Some methods for detecting a high-frequency current by the high-frequency current detection unit 13 will be described subsequently.

Figure 3:
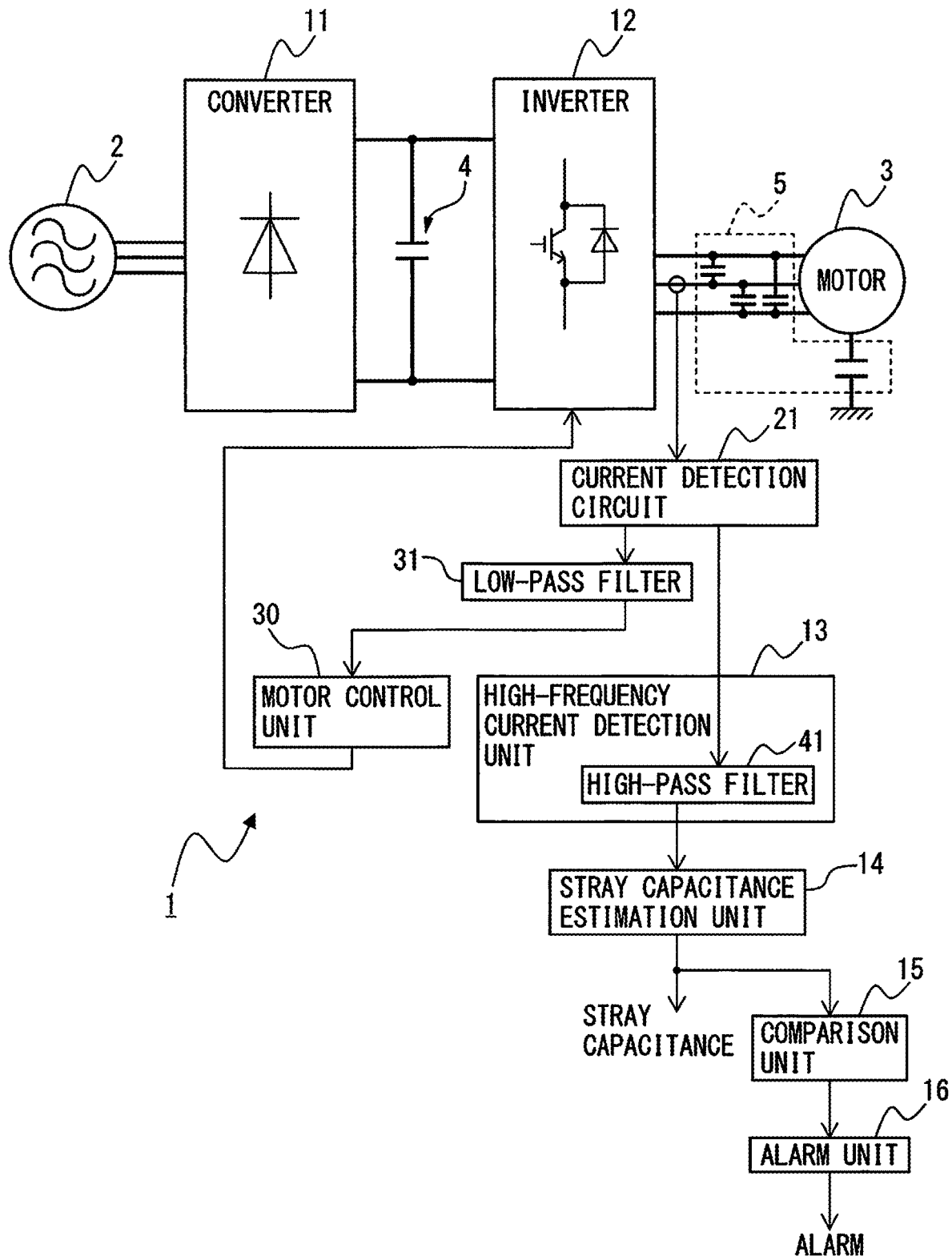
FIG. 3 is a diagram illustrating a first mode of a high-frequency current detection unit in the motor drive apparatus according to the embodiment of the present disclosure.

FIG. 3 is a diagram illustrating a first mode of a high-frequency current detection unit in the motor drive apparatus according to the embodiment of the present disclosure. The high-frequency current detection unit 13 according to the first mode includes a high-pass filter 41 configured to eliminate a current containing a frequency component lower than a cutoff frequency. The high-frequency current detection unit 13 according to the first mode uses the high-pass filter 41 to detect a high-frequency current to be used in processing for estimating a stray capacitance by the stray capacitance estimation unit 14, by eliminating a current component having a frequency lower than a predetermined cutoff frequency from the current flowing through the motor power line. The frequency of the high-frequency current is, e.g., several hundred kHz to several MHz and is independent of the frequency of the motor current. As an example, a current containing frequency components less than 100 kHz can be defined as a "current containing no high-frequency components," and a current containing frequency components of 500 kHz or more can be defined as a "current containing high-frequency components." When the cutoff frequency of the high-pass filter 41 is set to, e.g., 500 kHz, the high-frequency current detection unit 13 according to the first mode can detect a high-frequency current containing frequency components higher than 500 kHz. Since circuit components other than the high-frequency current detection unit 13 are the same as those described with reference to FIG. 1, the same reference numerals denote the same circuit components, and a detailed description thereof will not be given.

Figure 4:
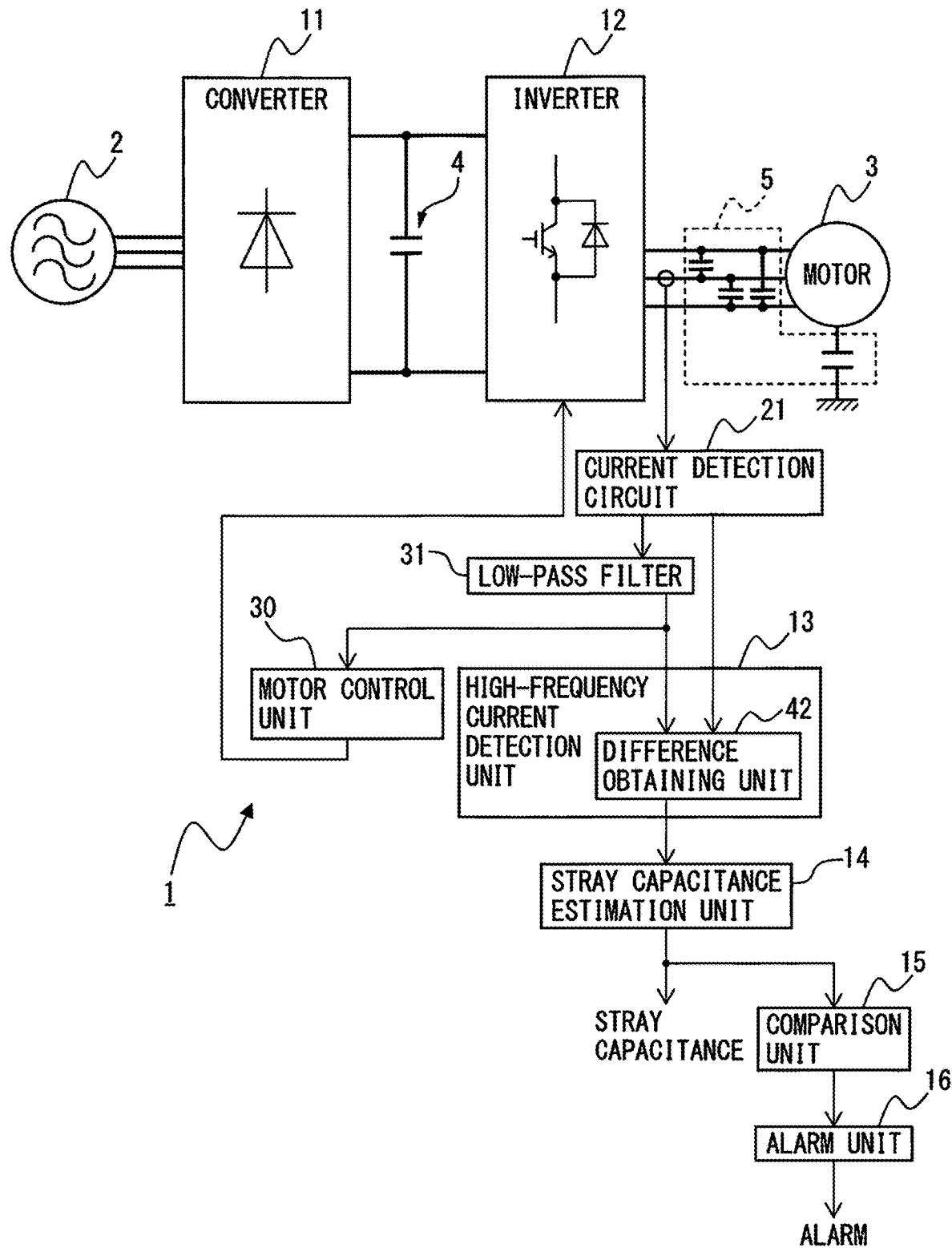
FIG. 4 is a diagram illustrating a second mode of the high-frequency current detection unit in the motor drive apparatus according to the embodiment of the present disclosure.

FIG. 4 is a diagram illustrating a second mode of the high-frequency current detection unit in the motor drive apparatus according to the embodiment of the present disclosure. The high-frequency current detection unit 13 according to the second mode includes a difference obtaining unit 42 configured to obtain the difference between the current flowing through the motor power line and the current obtained by eliminating a current containing a frequency component higher than a cutoff frequency from the current flowing through the motor power line using a low-pass filter 31. As described above, generally, as the inverter output current fed back to the motor control unit 30 to control the conversion operation of the inverter 12, the current (FIG. 2A) obtained by eliminating, using the low-pass filter 31, a current component having a frequency higher than a predetermined cutoff frequency from the current (FIG. 2B) flowing through the motor power line and detected by the current detection circuit 21 is used. The difference obtaining unit 42 calculates and obtains the difference between the current detected by the current detection circuit 21 (i.e., a current containing a high-frequency current) and the current output via the low-pass filter 31 (i.e., a current containing no high-frequency current and also used to control the power operation of the inverter 12 by the motor control unit 30). The high-frequency current detection unit 13 according to the second mode outputs the difference obtained by the difference obtaining unit 42 as a high-frequency current used in processing for estimating a stray capacitance by the stray capacitance estimation unit 14. Since circuit components other than the high-frequency current detection unit 13 are the same as those described with reference to FIG. 1, the same reference numerals denote the same circuit components, and a detailed description thereof will not be given.

FIG. 5 is a flowchart illustrating the operation sequence of the motor drive apparatus according to the embodiment of the present disclosure.

When the motor drive apparatus 1 drives the motor 3 in actual operation, in step S101 the current detection circuit 21 detects a current flowing through the motor power line connecting the inverter 12 and the motor 3 to each other.

In step S102, the high-frequency current detection unit 13 detects a high-frequency current from the current flowing through the motor power line and detected by the current detection circuit 21.

In step S103, the stray capacitance estimation unit 14 estimates a stray capacitance occurring in the motor power line and the motor 3, based on the high-frequency current detected by the high-frequency current detection unit 13.

In step S104, the comparison unit 15 compares the stray capacitance estimated by the stray capacitance estimation unit 14 with a threshold.

When the comparison unit 15 judges that the stray capacitance estimated by the stray capacitance estimation unit 14 is higher than the threshold, in step S105 the alarm unit 16 outputs an alarm signal. After that, "a stray capacitance high enough to cause erroneous operations or breakage has occurred" may be displayed on an accessory display attached to, e.g., a personal computer, a portable terminal, a control terminal for the motor drive apparatus 1, or a host controller for the motor drive apparatus 1, based on the alarm signal. Alternatively, the user may be informed, "a stray capacitance high enough to cause erroneous operations or breakage has occurred" by a printer or an acoustic device which emits a sound such as a loudspeaker, a buzzer, or a chime, as described above.

The comparison unit 15 may compare the stray capacitance estimated by the stray capacitance estimation unit 14 with thresholds having two levels: high and low in step S104, and the alarm unit 16 may output a warning signal or an alarm signal in step S105 in accordance with the result of comparison by the comparison unit 15.

In the above-described embodiment, the processes in steps S101 to S105 are executed when the motor drive apparatus 1 drives the motor 3 in actual operation, but a stray capacitance estimation mode may be separately set as an operation mode of the motor drive apparatus 1 at a timing different from that when the motor drive apparatus 1 drives the motor 3 in actual operation (normal operation mode), and the motor drive apparatus 1 may be operated in the stray capacitance estimation mode to execute steps S101 to S105, in which a stray capacitance is estimated.

The above-mentioned high-frequency current detection unit 13, stray capacitance estimation unit 14, comparison unit 15, and motor control unit 30 may be constructed in, e.g., software program form, or may be constructed as a combination of various electronic circuits and a software program. In this case, the function of each unit can be implemented by causing an arithmetic processing unit such as an ASIC or a DSP to operate the software program. The high-frequency current detection unit 13, the stray capacitance estimation unit 14, and the comparison unit 15 may be implemented in an arithmetic processing unit such as an ASIC or a DSP shared by the motor control unit 30, or may be implemented in an arithmetic processing unit such as an ASIC or a DSP independent of the motor control unit 30.

The current detection circuit 21 that detects a current flowing through the motor power line connecting the inverter 12 and the motor 3 to each other need only also serve as, e.g., a current detection circuit generally provided to detect an inverter output current fed back to the motor control unit 30 to control the conversion operation of the inverter 12, and no new current detection circuit may be provided as hardware. Further, a low-pass filter 31 is generally provided on the downstream side of the current detection circuit 21 to feed back an inverter output current obtained by eliminating high-frequency components to the motor control unit 30, but when the high-frequency current detection unit 13 according to the second mode is implemented, the output of the low-pass filter 31 need only be input to the difference obtaining unit 42, and no new low-pass filter may be separately provided. In this manner, according to this embodiment, since the current detection circuit 21 provided as hardware employs a current detection circuit already provided in the motor drive apparatus 1, no hardware for current detection may be separately provided, nor a high-frequency current measurement device for measuring a high-frequency current. In this embodiment, since a stray capacitance is estimated based on the current detected by the existing current detection circuit 21, the state in which a stray capacitance occurs in the motor power line and the motor 3 can be easily determined at low cost, and a measure to keep the stray capacitance as low as possible can be efficiently taken.

According to one aspect of the present disclosure, a motor drive apparatus capable of easily determining the stray capacitance of the motor power line and the motor at low cost can be achieved.

The invention claimed is:

1. A motor drive apparatus, comprising:
an inverter configured to convert an input DC voltage into an AC voltage for driving a motor, by ON/OFF driving of an internal power element, and output the AC voltage; and
a processor configured to
detect a high-frequency current from a current flowing through a motor power line upon application of the AC voltage to the motor via the motor power line, and
estimate a stray capacitance occurring in the motor power line and the motor, based on the high-frequency current,
wherein the processor is further configured to perform processing for estimating the stray capacitance, in a stray capacitance estimation mode executed at a timing different from a timing of a normal operation mode in which the motor is driven by the AC voltage output from the inverter, and
wherein the processor is further configured to
obtain a difference between the current flowing through the motor power line and a current obtained by eliminating a current containing a frequency component higher than a cutoff frequency from the current flowing through the motor power line using a low-pass filter, and output the difference obtained as the high-frequency current.

\* \* \* \* \*